(12) United States Patent
Kern et al.

(10) Patent No.: US 8,478,813 B2
(45) Date of Patent: Jul. 2, 2013

(54) TRANSPARENT MIGRATION OF ENDPOINT

(75) Inventors: Randall Kern, Redmond, WA (US);
Parveen Patel, Redmond, WA (US);
Lihua Yuan, Redmond, WA (US); Anil K. Ruia, Issaquah, WA (US); Wok Suk Yoo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/768,750

(22) Filed: Apr. 28, 2010

(65) Prior Publication Data
US 2011/0270908 A1 Nov. 3, 2011

(51) Int. Cl.
*G06F 15/16* (2006.01)

(52) U.S. Cl.
USPC ............................ 709/203; 709/227; 709/231

(58) Field of Classification Search
None
See application file for complete search history.

(56) References Cited

U.S. PATENT DOCUMENTS

| | | | |
|---|---|---|---|
| 6,920,501 B2 | 7/2005 | Chu et al. | |
| 7,565,446 B2 | 7/2009 | Talagala et al. | |
| 7,606,929 B2 | 10/2009 | Gbadegesin et al. | |
| 7,668,962 B2 * | 2/2010 | Tran et al. | 709/230 |
| 2005/0038848 A1 * | 2/2005 | Kaluskar et al. | 709/201 |
| 2005/0055435 A1 * | 3/2005 | Gbadegesin et al. | 709/224 |
| 2005/0086342 A1 | 4/2005 | Burt et al. | |
| 2005/0262411 A1 * | 11/2005 | Vertes et al. | 714/741 |
| 2006/0031524 A1 * | 2/2006 | Freimuth et al. | 709/227 |
| 2008/0219271 A1 | 9/2008 | Ollikainen | |
| 2010/0029275 A1 | 2/2010 | Bosch et al. | |

OTHER PUBLICATIONS

Olaru, et al., "On the Design and Performance of Kernel-level TCP Connection Endpoint Migration in Cluster-based Servers", Retrieved at << http://ieeexplore.ieee.org/stamp/stamp.jsp?tp=&arnumber=1558670&userType=inst >>, CCGRID, Proceedings of the Fifth IEEE International Symposium on Cluster Computing and the Grid (CCGrid'05), vol. 2—vol. 02, May 9-12, 2005.

Bernaschi, et al., "Migration of Secure Connections Using SockMi", Retrieved at << https://www.usenix.net/publications/login/2007-08/pdfs/bernaschi.pdf >>, USENIX, login, vol. 32, No. 4, Aug. 2007.

Burt, et al., "Techniques for Client-transparent TCP Migration", Retrieved at << http://web.cs.du.edu/~snarayan/sada/research/docs/jeebs8.pdf >>, Retrieved Date: Mar. 2, 2010.

(Continued)

*Primary Examiner* — John B. Walsh

(57) ABSTRACT

Architecture that facilitates the capture of connection state of a connection established between a client and an intermediate server and forwards the state to one or more target servers. A software component at the target server (as well as the intermediate server) uses this connection state to reply back to the client directly, thereby bypassing the intermediate server. All packets from the client related to the request are received at the intermediate server and then forwarded to the target server. The migration can be accomplished without any change in the client operating system and client applications, without assistance from a gateway device such as a load balancer or the network, without duplication of all packets between the multiple servers, and without changes to the transport layer stack of the intermediate and target servers.

19 Claims, 9 Drawing Sheets

OTHER PUBLICATIONS

Snoeren, et al., "Fine-grained Failover Using Connection Migration", Retrieved at << http://nms.lcs.mit.edu/papers/migrate-failover.pdf >>, Proceedings of the 3rd conference on USENIX Symposium on Internet Technologies and Systems, vol. 3, Mar. 26-28, 2001.

Sultan, et al., "Migratory TCP: Connection Migration for Service Continuity in the Internet", Retrieved at << http://csdl.computer.org/comp/proceedings/icdcs/2002/1585/00/15850469.pdf >>, ICDCS, Proceedings of the 22nd International Conference on Distributed Computing Systems (ICDCS'02), Jul. 2-5, 2002.

Snoeren, et al., "TCP Connection Migration", Retrieved at << http://nms.csail.mit.edu/talks/e2e-migrate.ps >>, Jun. 26, 2000.

Ray, et al., "A Secure TCP Connection Migration Protocol to Enable the Survivability of Client-Server Applications Under Malicious Attack", Retrieved at << http://www.springerlink.com/content/g5178xj026q4h157/fulltextpdf >>, Journal of Network and Systems Management, vol. 12, No. 2, Jun. 2004.

Snoeren, et al., "TCP Connection Migration <draft-snoeren-tcp-migrate-00.txt>", Retrieved at << http://nms.lcs.mit.edu/publications/draft-snoeren-tcp-migrate-00.txt >>, Nov. 2000.

Marwah, et al., "TCP Server Fault Tolerance Using Connection Migration to a Backup Server", Retrieved at << http://se.inf.tu-dresden.de/papers/preprint-DSN2003b.pdf >>, In the IEEE International Conference on Dependable Systems and Networks, Jun. 2003, pp. 1-10.

* cited by examiner

TRANSPARENT MIGRATION OF ENDPOINT

BACKGROUND

In a typical advanced request routing service, such as a load balancer, when a client initiates a connection request it is accepted by the request router. The client then follows up with the request data, the request router looks at the data, and based on the request data, the request router requests the actual content from a different (target) server. In this case, the request router is in the middle of the communications path back to the client. Consequently, all of the data that needs to go back to the client is routed from the target server through the request router.

This creates unnecessary network activity in many scenarios. In some cases the request router actually needs to look at the return data to cache the return data or process the data in other ways. However, in many cases, this traffic is completely unnecessary, as this approach consumes more network and network device bandwidth unnecessarily.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the capture of connection state of a connection established (due to a client request) between a client and an intermediate network device (e.g., a server) and forwards (migrates) the state to one or more target devices (servers). All packets from the client related to the request are received at the intermediate device and then forwarded to the target device. A software component at the target device then uses this connection state to reply back to the client directly, thereby bypassing the intermediate device.

More specifically, the architecture migrates the established connection (at the transport layer) from one endpoint to another endpoint without needing any change on the client operating system and client applications. Additionally, migration of the connection state can occur without assistance from the network. Moreover, the connection state can be migrated without duplication of all packets between multiple devices (servers).

In the context of servers, the migration technique enables direct server response from the target server to the client based on connection state migration. The implementation of connection migration can be done without requiring changes to the transport layer (e.g., TCP-transport control protocol) stack of the intermediate and target servers. However, these changes can be made in the transport layer as well, if desired.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
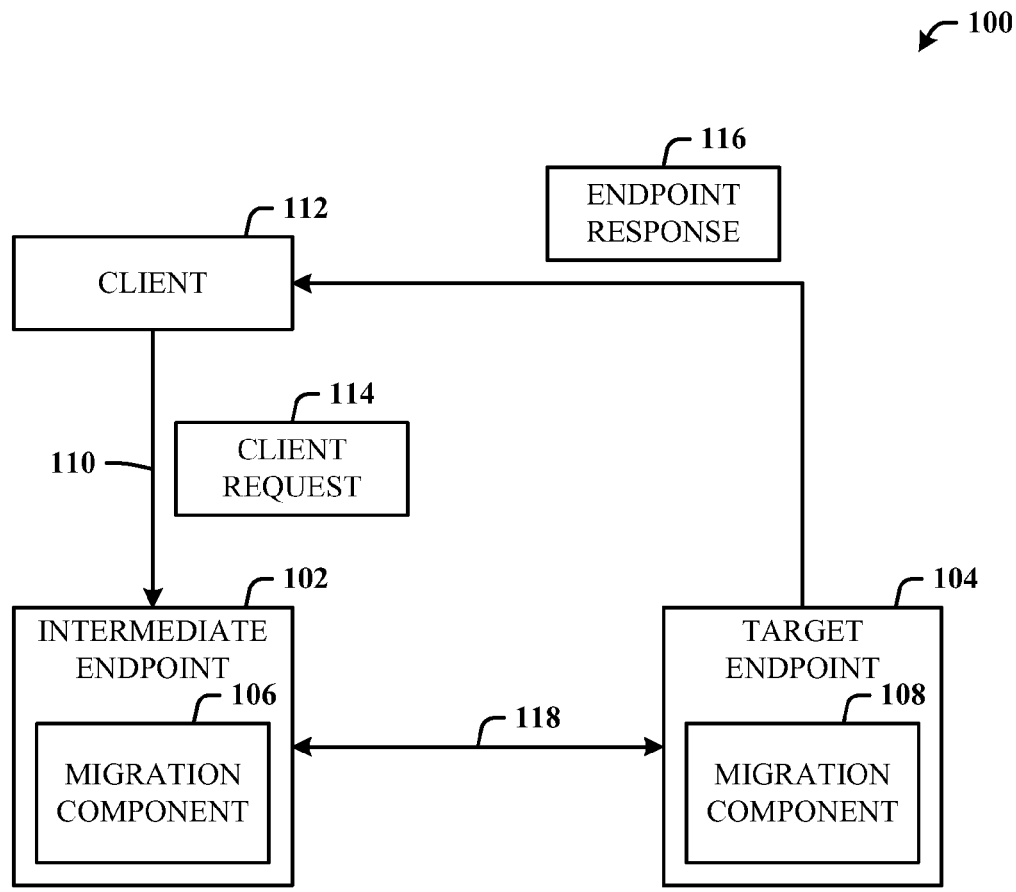
FIG. 1 illustrates a system in accordance with the disclosed architecture.

In conventional request/response processing systems where an intermediate server handles client requests and forwards the request to a target server to generate a response, and then sends that response back to the client, this effectively increases the computational resources such as memory and CPU available for request processing at the expense of roughly double the traffic on each node and related network infrastructure. The reason this occurs is that the intermediate server must terminate the connection from the client in order to receive the request and use the request contents to select a target server to process the request. For example, a user-name carried in an HTTP (hypertext transport protocol) header can be used to decide which target server should handle the request.

The disclosed architecture captures the connection state of the TCP connection at an intermediate (e.g., initial) server (device or endpoint) (where "intermediate" can be any server between the client and the target server) that receives a client request (e.g., URL-uniform resource locator) and forwards the connection state to a target server (network device) that ultimately generates the response to the client. A software component at the target server uses this state to reply back to the client directly, thereby bypassing the intermediate server from further involvement in the response back to the client.

The disclosed architecture is applicable to Application Request Routing (ARR), which is an IIS (Internet information services) extension that transforms IIS7.x into a layer 7 load balancer. (Both ARR and IIS are products developed by Microsoft Corporation.) The architecture enables ARR to achieve direct server return while still performing advanced layer 7 (as defined of the OSI (open systems interconnect) model) functions in ARR.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 employs a migration component for each of an intermediate endpoint 102 and a target endpoint 104 (the migration components designated differently here as migration component 106 for the intermediate endpoint 102 and migration component 108 for the target endpoint 104). The migration component 106 of the intermediate endpoint 102 captures connection state of an active client connection 110 established between a client 112 and the intermediate endpoint 102. The connection 110 is established based on a client request 114 received at the intermediate endpoint 102 and the target endpoint 104 chosen (selected) by the intermediate endpoint. The migration component 108 of the target endpoint 104 creates a response 116 to the request 114 and sends the response 116 directly to the client 112 based on the connection state.

The migration component (refers generally herein to the migration component 106 and migration component 108) operates at a transport layer. The migration component 106 of the intermediate endpoint 102 captures the connection state and forwards the connection state to the target endpoint 104 based on a policy applied to the request 114. For example, the policy can be to choose a target server based on load on the target servers.

The migration component includes a migration hand-off library that forwards the request to the target endpoint 104, a migration driver that resides at a transport layer, and a migration controller that handles control packet traffic. The migration library accesses transport layer statistics of the connection state and, collects send/receive information and connection parameters of the connection state between the client 112 and the intermediate endpoint 102. The migration library opens a server connection 118 to the target endpoint 104 based on the collected information and parameters. The migration component 106 of the intermediate endpoint 102 instructs the migration component 108 of the target endpoint 104 to translate outgoing packets from the target endpoint 104 to a port (e.g., transport address) of the client 112 based on the connection state associated with the active client connection 110. The migration component 108 of the target endpoint 104 watches for a connection reset of the active client connection 110 and resets the server connection 118 in response to the connection reset.

The following assumptions are considered in this disclosed architecture. A connection of the intermediate endpoint 102 is eligible for hand-off if the following conditions are satisfied: when the hand-off begins at the intermediate endpoint 102, there is no outstanding data from the client 112 that has not been handed to the intermediate endpoint application, and there is no unacknowledged outstanding data from the intermediate endpoint 102 to the client 112 (all the data has been acknowledged by the client 112).

Figure 2:
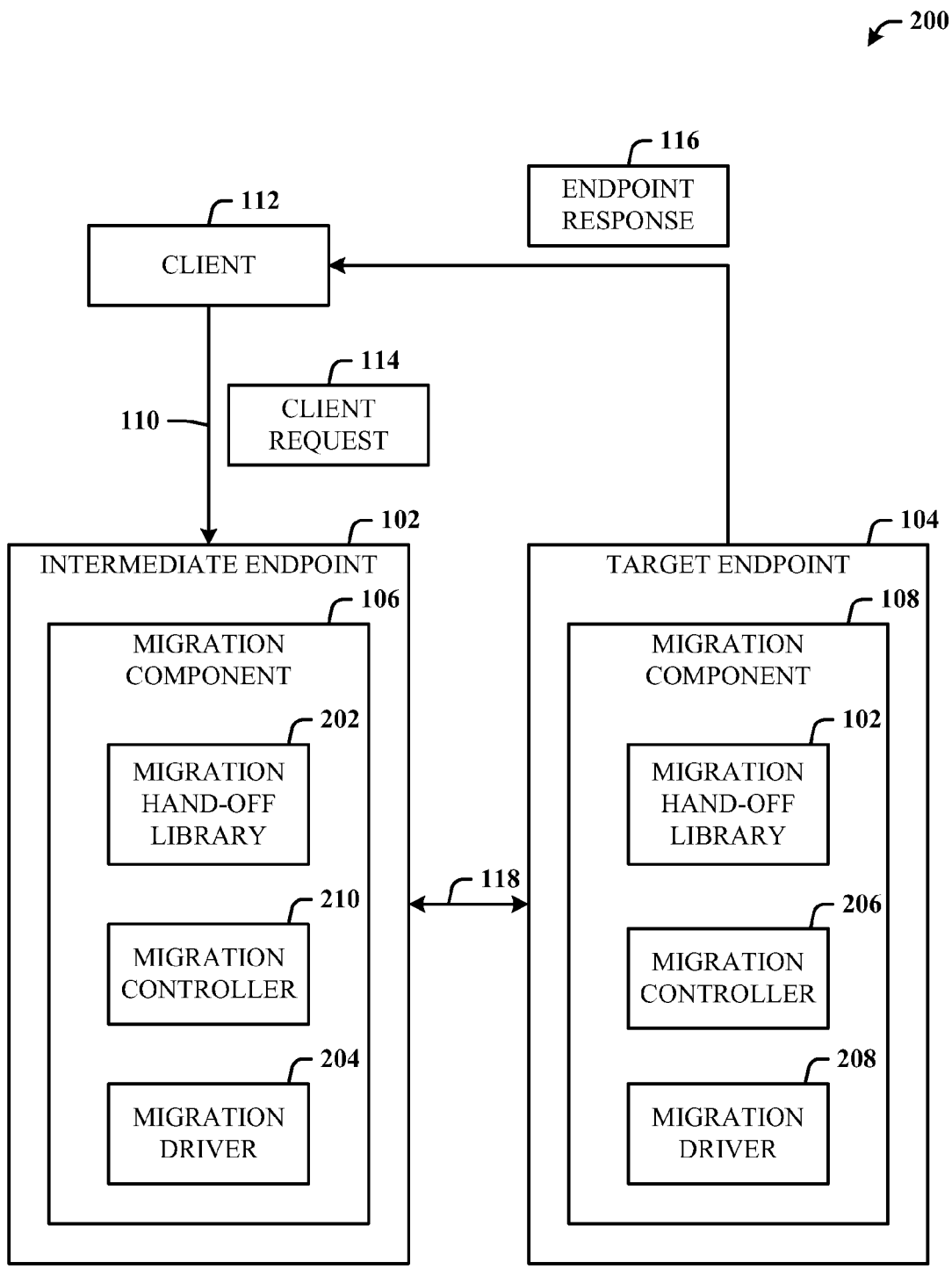
FIG. 2 illustrates a system that employs the migration architecture.

FIG. 2 illustrates a system 200 that employs the migration architecture. As previously indicated, the subcomponents of the migration component that facilitate the connection migration include: a migration hand-off library, which is an application component that hands off connections to other endpoints (e.g., servers), a migration driver that is installed on endpoints (e.g., servers) such as the intermediate endpoint 102 and the target endpoint 104, and a migration controller that is also installed on the endpoints (e.g., the intermediate endpoint 102 and the target endpoint 104) to handle control traffic.

The migration algorithm operates as follows. The client 112 makes a client connection to a transport endpoint (e.g., an IP port) to send the client request 114. The intermediate endpoint 102 accepts the client connection 110 and receives data from the client 112 (acknowledgements are sent normally). Once the intermediate endpoint 102 has determined the target endpoint 104 for the client request 114, the intermediate endpoint 102 calls its associated migration hand-off library 202 with the following information: socket (client connection), target, port, and data.

The intermediate hand-off library 202 retrieves TCP (transmission control protocol) extended statistics (TCP ESTATS) on the client connection 110 and gathers information about send/receive sequence numbers and other connection parameters, such as MSS (maximum segment size). The intermediate migration hand-off library 202 opens the forwarding TCP connection 118 to the target endpoint 104 with the appropriate connection parameters obtained from the TCP extended statistics and sends the data to the target endpoint 104 (if there is data loss, data is retransmitted from the intermediate endpoint 102 to the target endpoint 104). This data informs the target endpoint 104 of the client request.

At this point, the target endpoint 104 has received all the request related data it needs to respond back to the client 112. The intermediate migration hand-off library 202 retrieves the TCP extended statistics on the forwarding connection 118 and gathers information about send/receive sequence numbers.

The intermediate migration hand-off library 202 instructs its associated intermediate migration controller 210 to migrate connection 110 to connection 118. The migration controller 210 instructs migration driver 204 to perform network address translation (NAT) and transport state translation on the data from the client connection 110 to the forwarding connection 118 by providing the address and sequence number information for both connections (110 and 118).

The intermediate migration controller 210 informs the target migration controller 206 on the target endpoint 104 to start NAT of outgoing packets from the target endpoint 104 for the forwarding connection 118 using the IP and sequence number information from the client connection 110. The target migration controller 206 passes the parameters obtained from the intermediate controller 210 down to the target migration driver 208. When the target endpoint 104 sends any data, the target migration driver 208 applies the appropriate translation so that packets flow directly to the client 112 (packets on the wire have the same format as if coming back over the client connection 110).

When the client 112 sends acknowledgments and/or data packets back to the IP port, the intermediate migration driver 204 on the intermediate endpoint 102 applies the appropriate translation and sends those packets to the target endpoint 104. The target migration driver 208 watches for connection reset by the intermediate endpoint 102 on the client connection 110, and once the reset has occurred on the client connection 110, the target migration driver 208 forces a reset on the forwarding connection 118 between the intermediate endpoint 102 and the target endpoint 104. The intermediate migration hand-off library 202 closes the client connection 110 whenever the forwarding connection 118 is closed.

In an alternative implementation, the intermediate migration hand-off library 202 can signal another device in the network, such as a router or a load balancer (not shown), to perform the translation on incoming packets to the intermediate endpoint 102, thereby further reducing the load on the intermediate server.

Figure 3:
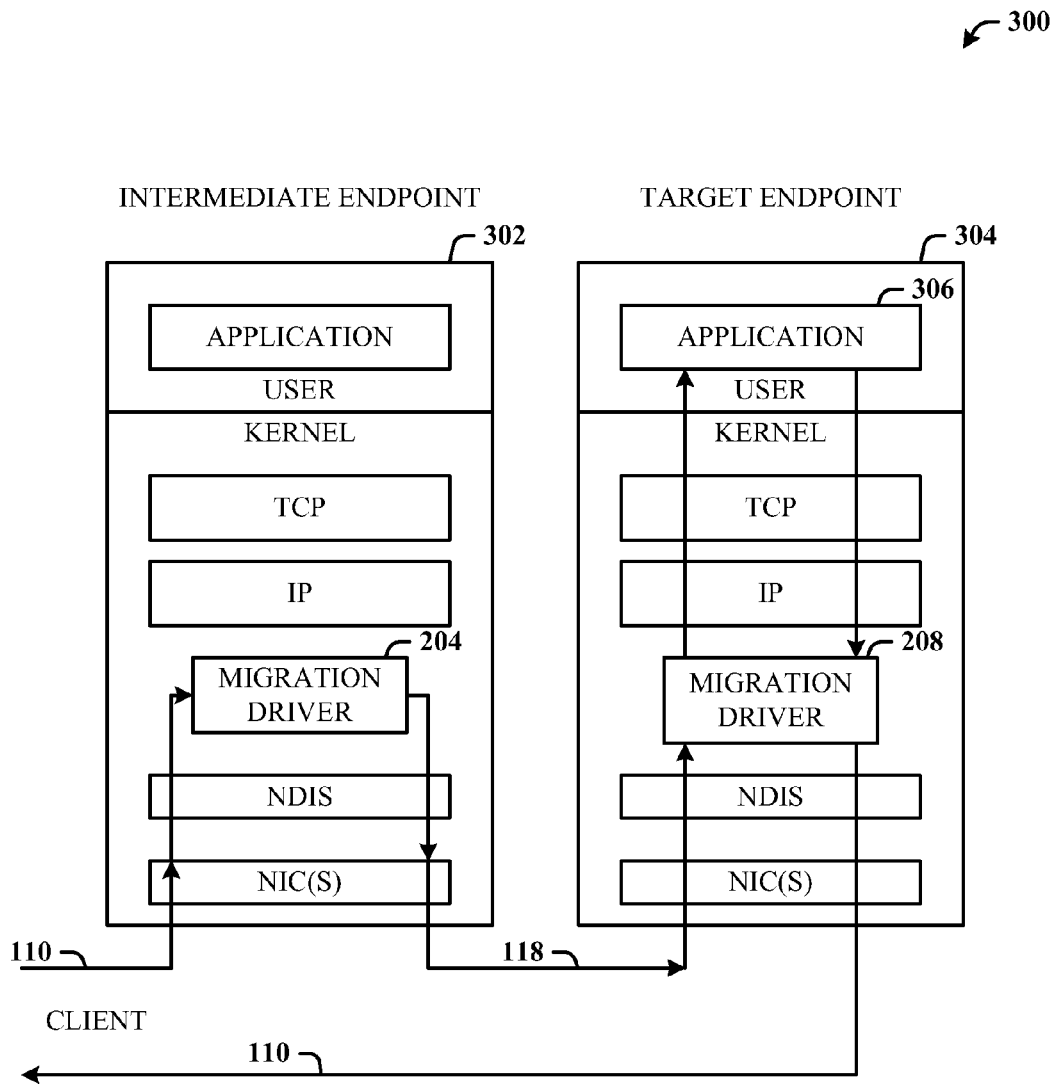
FIG. 3 illustrates communications in endpoint protocol stacks after endpoint migration.

FIG. 3 illustrates communications in endpoint protocol stacks 300 after endpoint migration. The stacks 300 include an intermediate endpoint stack 302 and a target endpoint stack 304. Packets from the client enter the intermediate stack 302 through the physical layer (NICs-network interface cards) and the NDIS (network driver interface specification), an API (application programming interface) for NICs, to the intermediate migration driver 204. The intermediate migration driver 204 captures the packets for connection 110 established between the client and the intermediate endpoint 302.

The intermediate driver 204 translates the packets so that the packets appear to be coming from connection 118 and sends the packets to the target endpoint 304. The target migration driver 208 allows the request through to a target endpoint application 306 that receives the request and generates a response. The response is passed down to the target migration driver 208. The driver translates the response packets so the response packets appear to be coming on connection 110 and sends the response packets directly to the client. The target driver 208 does the translation for all packets generated on connection 118, including control packets generated by the protocol stack.

Figure 4:
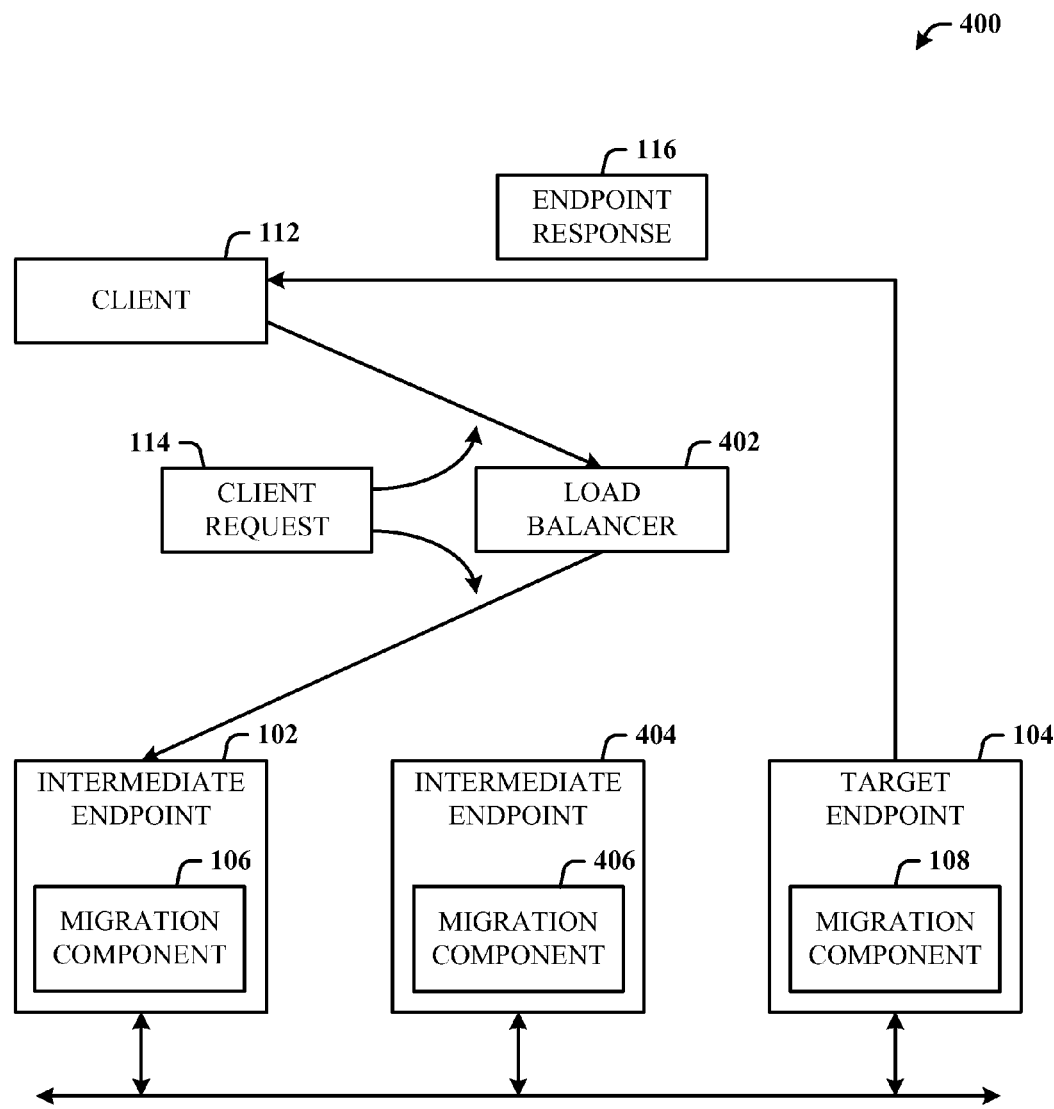
FIG. 4 illustrates a system that includes other entities that may perform migration according to the disclosed architecture.

FIG. 4 illustrates a system 400 that includes other entities that may perform migration according to the disclosed architecture. Here, the client request 114 is communicated through a load balancer 402, and then routed to an initial endpoint (e.g., intermediate endpoint 102). The initial endpoint establishes a connection, receives the request, analyzes it, and routes the request 114 to the target endpoint 104 along with connection migration state. The target endpoint 104 then responds directly to the client 112 with the endpoint response 116.

In another scenario, the intermediate endpoint 102 does not know the location of the target endpoint 104 and redirects the request 114 to a second intermediate endpoint 402 that may know the location of the target endpoint 104, which after analyzing the request 114 and potentially after generating a partial response, forwards the request 114 to the target endpoint 104 for direct response to the client 112. It can be the case that the response 116 is routed through the second intermediate endpoint 404 (and associated second intermediate migration component 406) for direct communication to the client 112.

In yet another scenario, there is a predetermined amount of time (e.g., milliseconds) that the response is due back to the client 112. In this case, if the request is not expected to generate a response within the allotted time, the request will be passed on to another endpoint for response processing, and so on until a response is received back at the client 112.

In yet another scenario, the request can be migrated to other endpoints to get results or more results in the allotted time. For example, if the allotted time to receive the response at the client 112 is five hundred milliseconds, the request 114 can be migrated along the endpoints to accumulate responses within the five hundred millisecond time frame.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
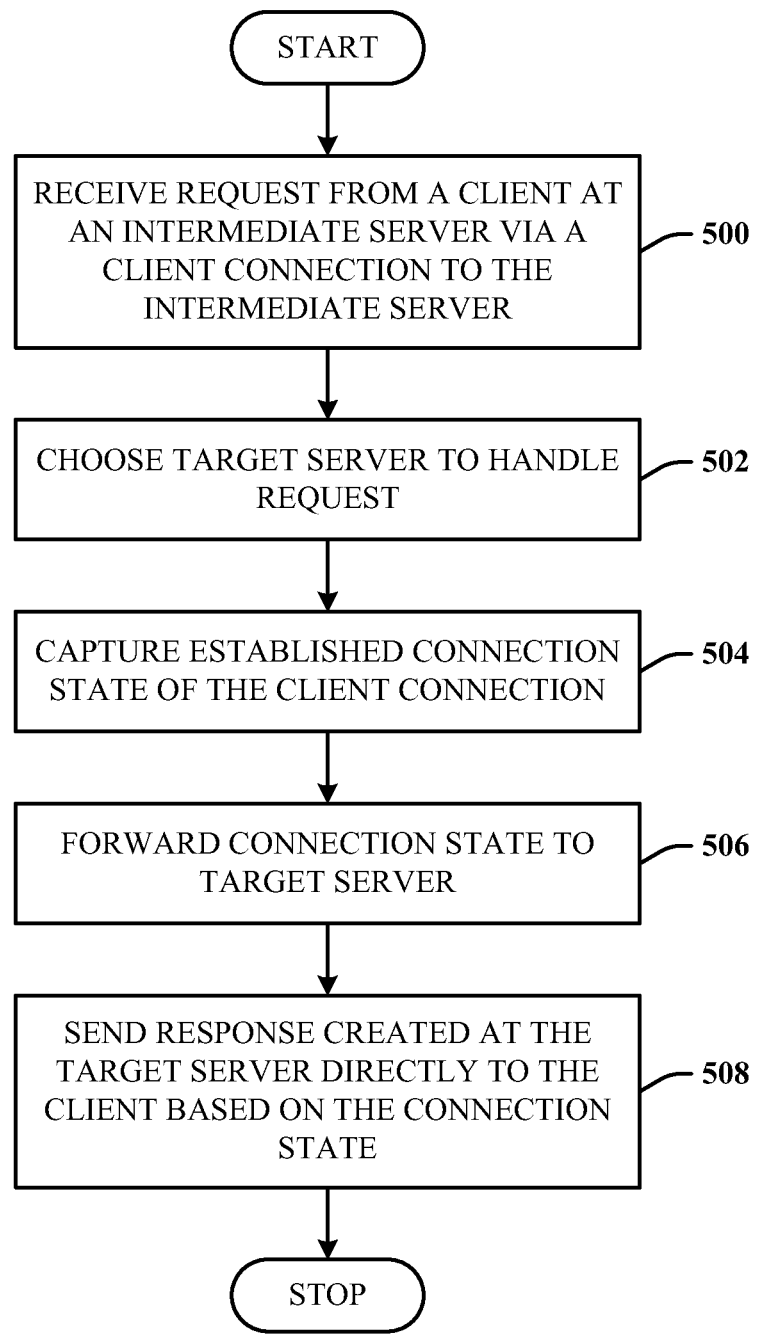
FIG. 5 illustrates a method of processing a request in accordance with the disclosed architecture.

FIG. 5 illustrates a method of processing a request in accordance with the disclosed architecture. At 500, a request is received from a client at an intermediate server via a client connection to the intermediate server. At 502, choose target server to handle request. At 504, established connection state of the client connection is captured. At 506, the connection state is forwarded to the target server. At 508, a response created at the target server is sent directly to the client based on the connection state.

Figure 6:
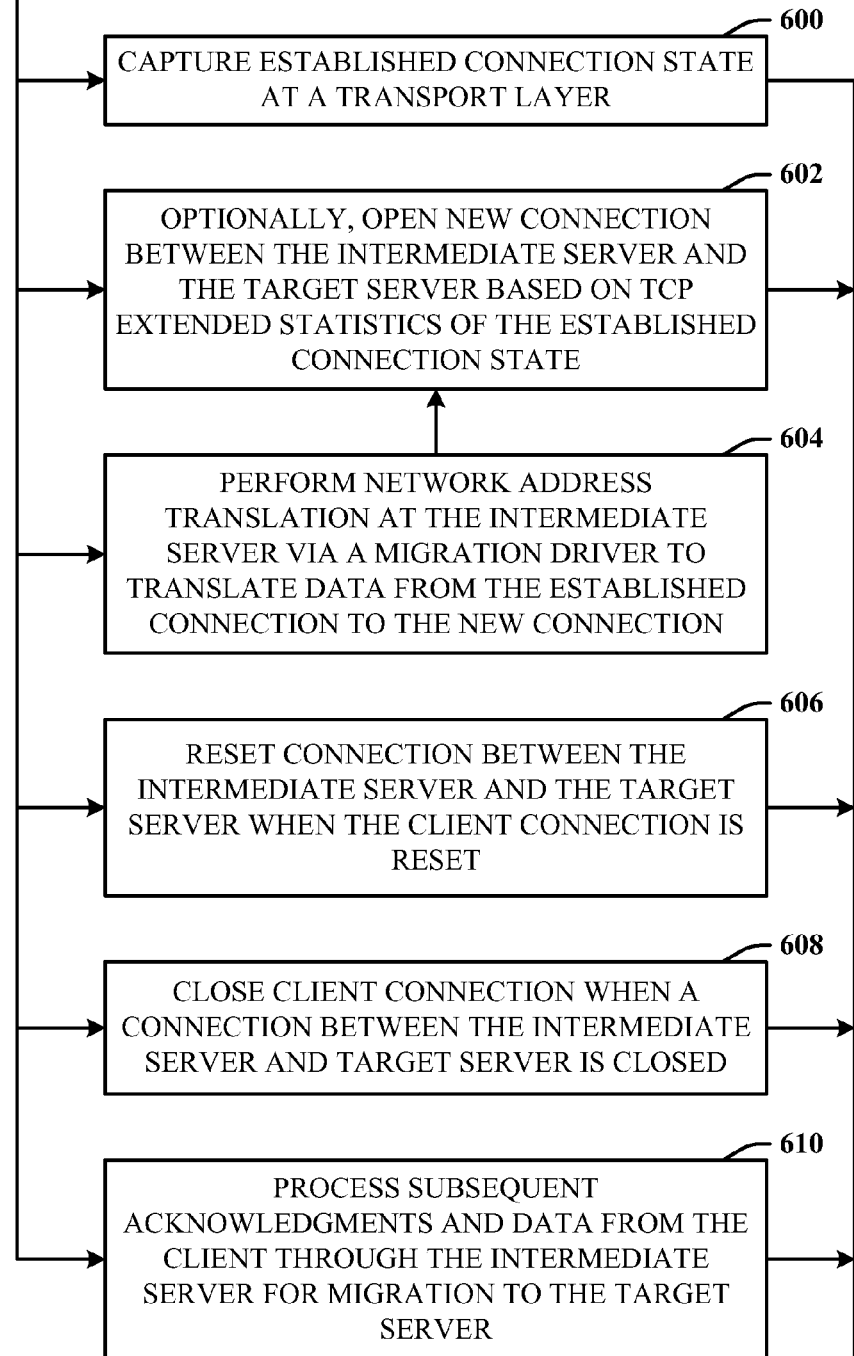
FIG. 6 illustrates further aspects of the method of FIG. 5.

FIG. 6 illustrates further aspects of the method of FIG. 5. At 600, the established connection state is captured at a transport layer. At 602, optionally, a new connection is opened between the intermediate server and the target server based on TCP extended statistics of the established connection state. Note that the same transition can be applied to an existing connection. At 604, network address translation is performed at the intermediate server via a migration driver to translate data from the established connection to the new connection. At 606, a connection between the intermediate server and the target server is reset when the client connection is reset. At 608, the client connection is closed when a connection between the intermediate server and target server is closed. At 610, subsequent acknowledgments and data from the client are processed through the intermediate server for migration to the target server.

Figure 7:
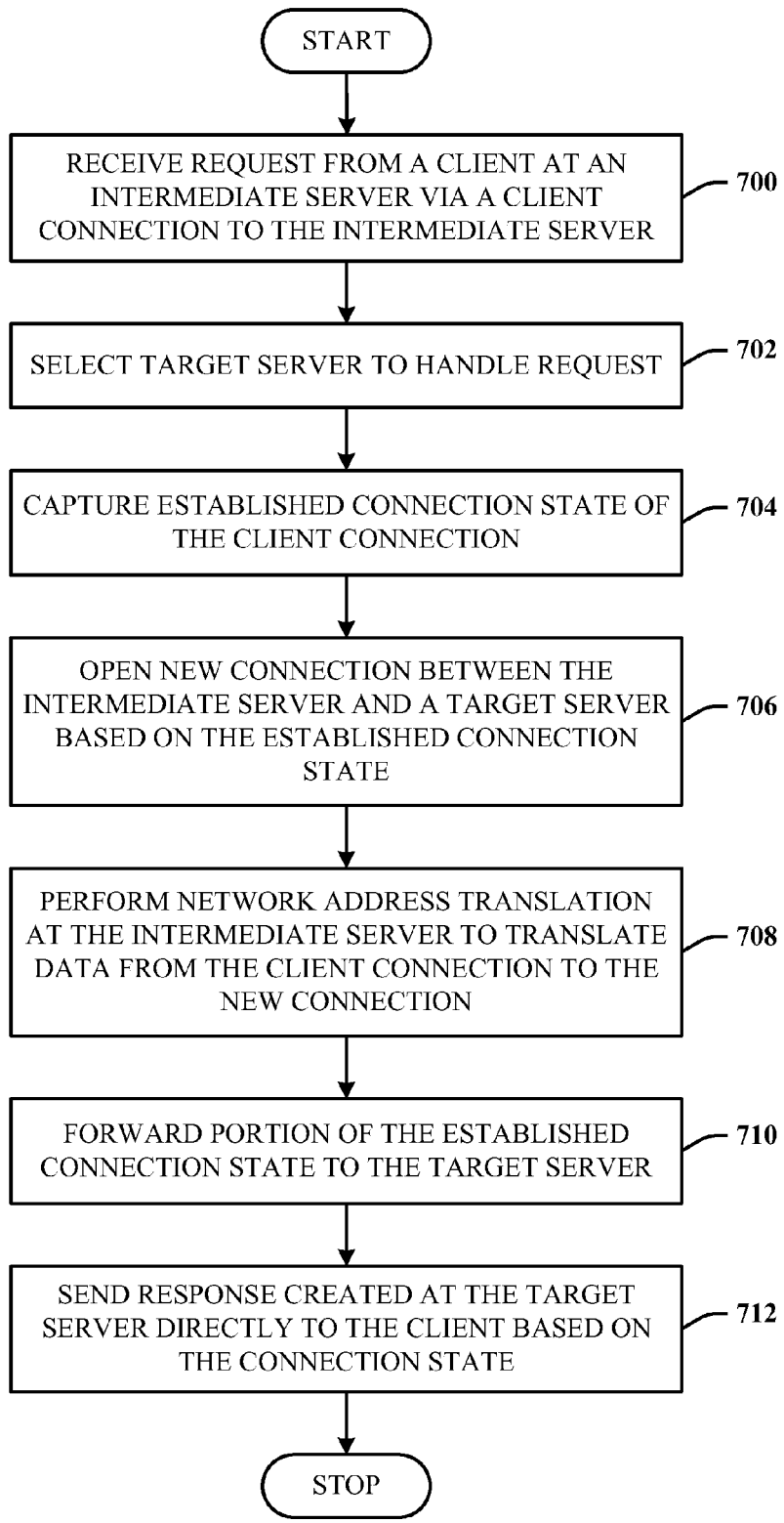
FIG. 7 illustrates an alternative method of processing a request.

FIG. 7 illustrates an alternative method of processing a request. At 700, a request is received from a client at an intermediate server via a client connection to the intermediate server. At 702, a target server to handle the request is selected. At 704, established connection state of the client connection is captured. At 706, a new connection is opened between the intermediate server and a target server based on the established connection state. At 708, network address translation is performed at the intermediate server to translate data from the client connection to the new connection. At 710, a portion of the established connection state is forwarded to the target server. At 712, a response created at the target server is sent directly to the client based on the connection state.

Figure 8:
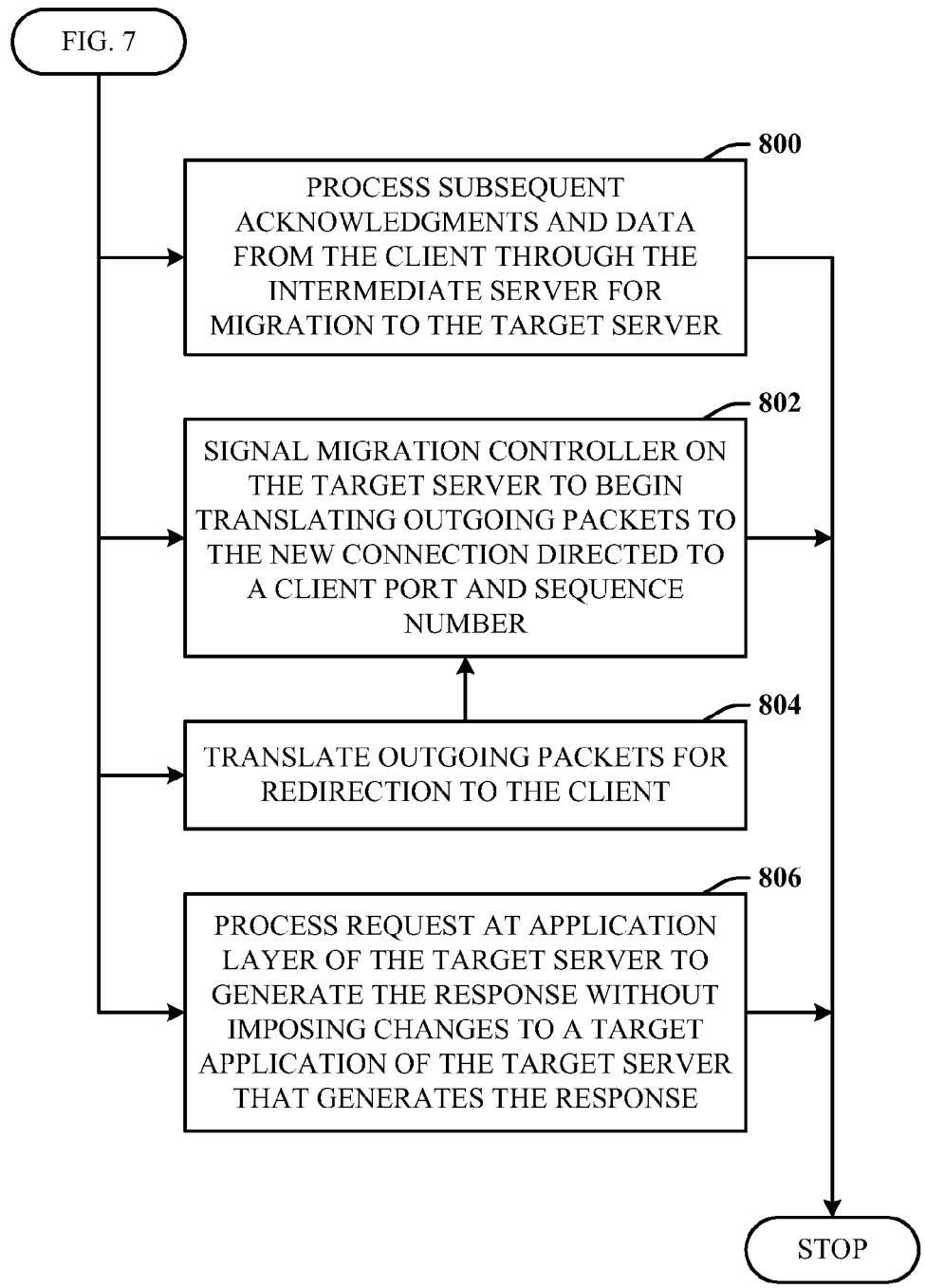
FIG. 8 illustrates further aspects of the method of FIG. 7.

FIG. 8 illustrates further aspects of the method of FIG. 7. At 800, subsequent acknowledgments and data from the client are processed through the intermediate server for migration to the target server. At 802, a migration controller on the target server is signaled to begin translating outgoing packets to the new connection directed to a client port and sequence number. At 804, the outgoing packets are translated for redirection to the client. At 806, the request is processed at an application layer of the target server to generate the response without imposing changes to a target application of the target server that generates the response.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
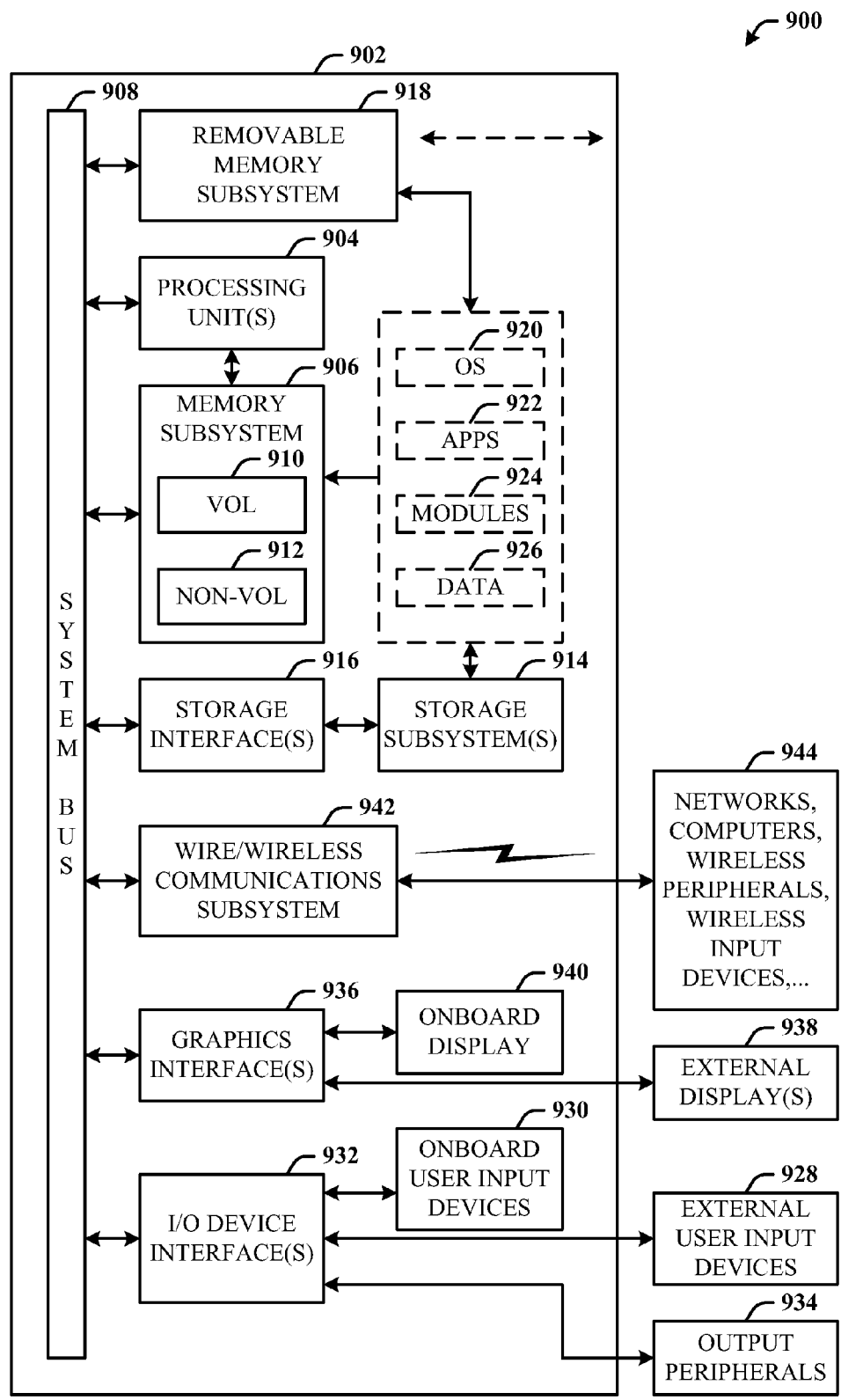
FIG. 9 illustrates a block diagram of a computing system that executes endpoint migration in accordance with the disclosed architecture.

Referring now to FIG. 9, there is illustrated a block diagram of a computing system 900 that executes endpoint migration in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the system 200 of FIG. 2, the flow of the stacks 300 of FIG. 3, the entities and components of the system 400 of FIG. 4, and the methods represented by the flowcharts of FIGS. 5-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system having computer readable media that store executable instructions executed by a processor, comprising:
    a migration component for each of an intermediate endpoint and a target endpoint, the migration component includes a migration hand-off library that forwards a request to the target endpoint, a migration driver that resides at a transport layer, and a migration controller that handles control packet traffic,
        the migration component of the intermediate endpoint captures connection state of an active client connection established between a client and the intermediate endpoint, the connection established based on the client request received at the intermediate endpoint and the target endpoint chosen by the intermediate endpoint;
        the migration component of the target endpoint creates a response to the request and sends the response directly to the client instead of the intermediate device based on the connection state, thereby bypassing the intermediate device; and
    a microprocessor that executes computer-executable instructions associated with at least one of the migration components.

2. The system of claim 1, wherein the migration component operates at a transport layer.

3. The system of claim 1, wherein the migration component of the intermediate endpoint captures the connection state and forwards the connection state to the target endpoint based on a policy applied to the request.

4. The system of claim 1, wherein the migration component of the intermediate endpoint instructs the migration component of the target endpoint to translate outgoing packets from the target endpoint to a transport address of the client based on the connection state associated with the active client connection.

5. The system of claim 1, wherein the migration library accesses transport layer statistics of the connection state and, collects send/receive information and connection parameters of the connection state between the client and the intermediate endpoint.

6. The system of claim 5, wherein the migration library opens a server connection to the target endpoint based on the collected information and parameters.

7. The system of claim 6, wherein the migration component of the target endpoint watches for a connection reset of the active client connection and resets the server connection in response to the connection reset.

8. A computer-implemented method performed by a computer system executing machine-readable instructions, the method comprising acts of:
    receiving a request from a client at an intermediate server via a client connection to the intermediate server;
    choosing a target server to handle the request;
    capturing established connection state of the client connection;
    translating data from the client connection to a new connection using the intermediate server;
    forwarding the connection state to the target server; and
    sending a response created at the target server directly to the client based on the connection state, so that the response bypasses the intermediate device when sent to the target server.

9. The method of claim 8, further comprising capturing the established connection state at a transport layer.

10. The method of claim 8, further comprising opening the optional new connection between the intermediate server and the target server based on TCP extended statistics of the established connection state.

11. The method of claim 10, further comprising performing network address translation at the intermediate server via a migration driver to translate data from the established connection to the new connection.

12. The method of claim 8, further comprising resetting a connection between the intermediate server and the target server when the client connection is reset.

13. The method of claim 8, further comprising closing the client connection when a connection between the intermediate server and target server is closed.

14. The method of claim 8, further comprising processing subsequent acknowledgments and data from the client through the intermediate server for migration to the target server.

15. A computer-implemented method performed by a computer system executing machine-readable instructions, the method comprising acts of:
- receiving a request from a client at an intermediate server via a client connection to the intermediate server;
- selecting a target server to handle the request;
- capturing established connection state of the client connection;
- opening a new connection between the intermediate server and a target server;
- performing network address translation at the intermediate server to translate data from the client connection to the new connection;
- forwarding a portion of the established connection state to the target server; and
- sending a response created at the target server directly to the client based on the connection state, in order to bypass the intermediate device for the sending of the response.

16. The method of claim 15, further comprising processing subsequent acknowledgments and data from the client through the intermediate server for migration to the target server.

17. The method of claim 15, further comprising signaling a migration controller on the target server to begin translating outgoing packets to the new connection directed to a client port and sequence number.

18. The method of claim 17, further comprising translating the outgoing packets for redirection to the client.

19. The method of claim 15, further comprising processing the request at an application layer of the target server to generate the response without imposing changes to a target application of the target server that generates the response.

* * * * *